No. 730,912. PATENTED JUNE 16, 1903.
U. HEATER.
ANIMAL SALT BOX.
APPLICATION FILED AUG. 28, 1902.
NO MODEL.
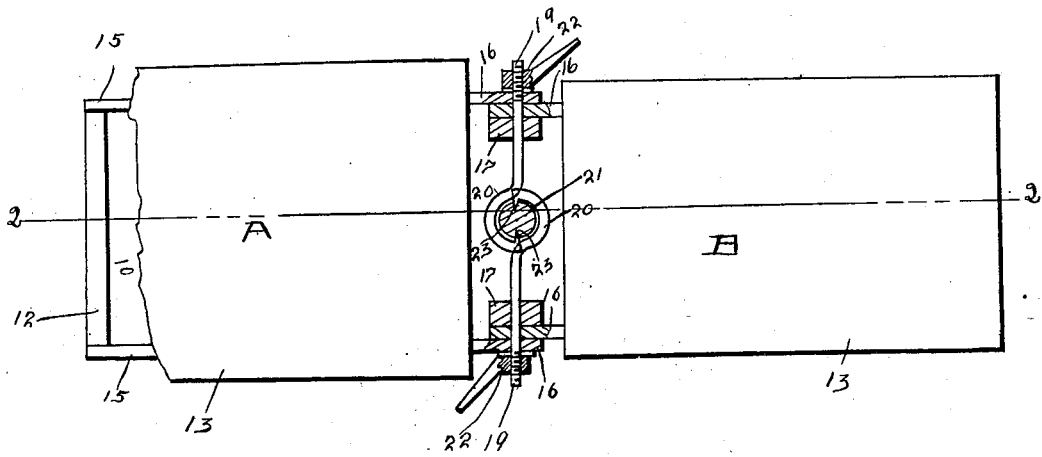
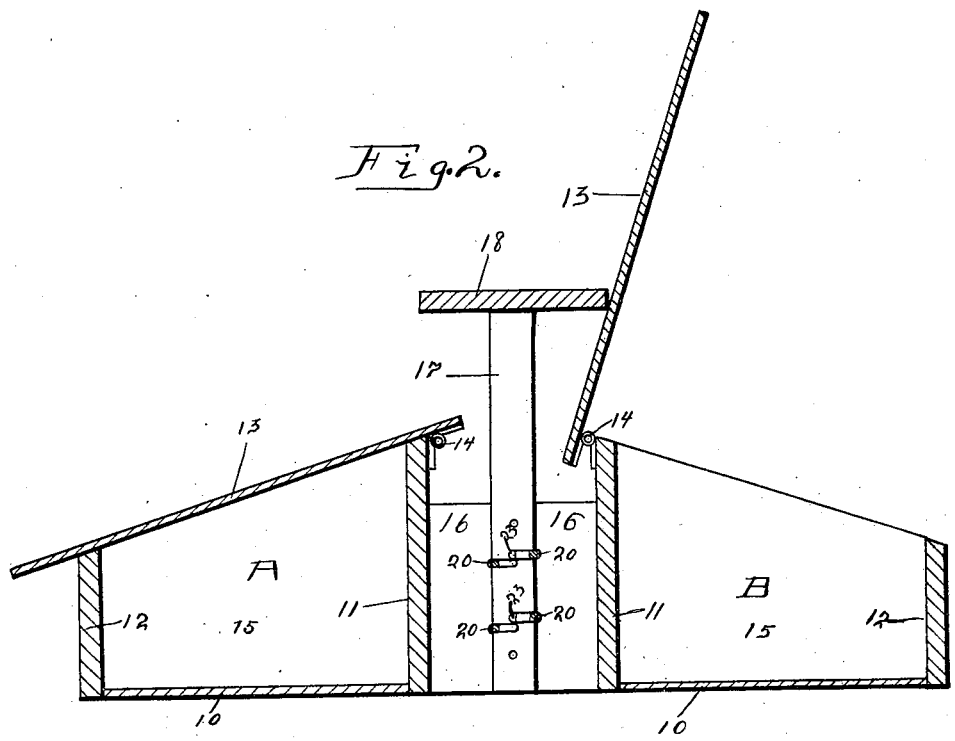
Witnesses.
L. L. Leibrock.
L. H. Orwig.
Inventor. Uriah Heater
by
Orwig & Lane, Attys.

No. 730,912. Patented June 16, 1903.

UNITED STATES PATENT OFFICE.

URIAH HEATER, OF LORIMOR, IOWA.

ANIMAL SALT-BOX.

SPECIFICATION forming part of Letters Patent No. 730,912, dated June 16, 1903.

Application filed August 28, 1902. Serial No. 121,400. (No model.)

*To all whom it may concern:*

Be it known that I, URIAH HEATER, a citizen of the United States, residing at Lorimor, in the county of Union and State of Iowa, have invented a certain new and useful Animal Salt-Box, of which the following is a specification.

The objects of my invention are to provide a device for holding salt which will be proof against the weather and which is designed to be placed in an open field and is to be so arranged that the animals can obtain access to the salt in the salt-box.

A further object is to provide a salt-holding device for animals which can be easily and readily adjusted to any ordinary post in the field.

A further object is to provide an animal salt-holding device the cover of which can be easily raised by the animal on account of the cover of the box being substantially wider and longer than the box proper.

A further object is to provide means for limiting the upward movement of the cover of the box, so that when the animal has taken its head from beneath the cover the cover will drop of its own weight to the position in which it was before the animal raised it.

A further object is to provide means for attaching two or more of my boxes together and attaching said boxes to a post or tree.

A further object is to provide a salt-containing device the cover of which is arranged on a slight slope, so as to allow the water to run off freely from the cover, and thus prevent it from getting into the interior of the box.

One of the main objects, however, is to provide means whereby my salt-boxes may be easily raised or lowered on the ordinary post, so that the salt-box can be adjusted at any height, so that animals of any size can obtain salt on the interior of the box.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 is a top or plan view of the complete device with a portion of one of the covers broken away to show the width of the cover compared with the width of the box proper. I have also cut away a portion of the posts which support the mechanism for limiting the upward movement of the covers and have shown these posts and the adjoining parts of the box in cross-section. This is done to clearly show the way of attaching my boxes together and to the post; and Fig. 2 shows a cross-sectional view of the device through line 2 2 of Fig. 1 and also shows one cover in an open and the other in a closed position.

Referring to the accompanying drawings, I have used the reference-numeral 10 to indicate the bottom of my box, the reference-numeral 11 to indicate the back of my box, and the reference - numeral 12 to indicate the back portion and front end thereof. The back portion is substantially higher than front portion, and the top portions of both the back 11 and the front 12 are slightly beveled, so that the cover 13, which is considerably wider than the width of the front and back portions 11 and 12, will fit tightly on top of these portions. The top cover 13 is hinged to the back portion 11 by means of the hinge 14. The box also has the side portions 15, said side portions being attached to the bottom 10 and to the front end 12, and the back 11 and the top portion of the sides 15 are sloped downwardly, so that the top portions of the sides 15 are in a line with the top beveled portion of the back 11 and the front 12. As indicated, the cover 13 extends a slight distance over the sides 15 and is considerably longer than the distance between the front portion 12 and the rear portion 11. As clearly shown in Fig. 2 of the drawings, the sides 15 at their rear end extend some distance to the rear of the back 11, and said side portions on the extensions 16, which are at the rear of the back portions 11, are of substantially the same height as the front portion 12.

One of the boxes of my device may be made slightly wider than the other, so that the extensions 16 of the one box will fit between the extensions 16 of the other box. For the purpose of making this point more clear I have referred to one of the boxes by the letter A and the other box by the letter B. The box A is made slightly wider than the box B, and in consequence thereof the extensions 16 on the box A will fit outside of the extensions 16 on the box B, for purposes hereinafter made clear. It may be, however, desirable to make these boxes of the same width, and in this case one of the projections 16 of the box A would be outside of the projections 16 of the box B nearest it and the other extension 16 of the box A will be inside of the other extension of the box B, and the boxes can thus be firmly held together as well as if the boxes were of different widths. I have provided upright posts 17, which can be easily attached between the extensions 16 of either of the boxes. At the top of these posts 17 I have mounted at right angles to them the board 18, said board connecting the posts 17 and being slightly wider than the distance between the hinges 14 of the boxes, or in case one box is used the distance between the outside of the post 17 and the hinge 14 is considerably less than the distance between the point of attachment of the board 18 and the cover 13 when it is at its upper limit of movement, so that by means of this board 18 the cover will be limited in its upward limit of movement when the posts 17 are attached to the projections 16 of the sides 15. This is best shown in Fig. 2 of the drawings. Extending through the projections 16 of the box and through the upright posts 17 are the screw-threaded rods 19, having a semicircular portion 20 at their inner end. Said screw-threaded rods are rotatable within these extensions 16 and posts 17, so that they can be turned to any desired position. The semicircular portions 20 of the screw-threaded rods overlap each other slightly and at their inner ends have a projection which is substantially in line with the main portion of the rod 19 and extends toward said body portion.

I have represented the post to which the salt-boxes are attached by the numeral 21, so that when these semicircular portions are fitted around this post and the arm-bearing nut 22 is turned on the screw-threaded rod 19 and as said screw-threaded portion is outside of the extensions 16 the nut will engage the outside portion of the extensions 16 and draw the projections 23, which are on the inner end of the semicircular portion 20, into the wood of the post 21, and as both these rods are drawn outwardly the semicircular portions will engage the post 21 and will consequently hold the salt-box firmly in position relative to the post 21. Any number of these rods having semicircular portions may be extended through the projections 16 of the sides and also through the upright posts, and thus more securely hold the salt-box in position. For the purpose of illustration I have simply used two sets of these screw-threaded rods 19. It can be easily seen that by unscrewing the arm-bearing nut the semicircular portion will be released readily from the post 21 and in consequence the salt-boxes will be raised or lowered. Presuming that more than one salt-box is to be attached to the post, the extensions of each box are placed against each other and the rod 19 is passed through the extension at each box, and it will thus be seen that both boxes will be readily supported by this means.

In practical use the salt is placed in the box and the device is attached to the post or tree by the means above referred to and held securely in that position. The animal will readily smell the salt in the box and will soon put its nose beneath the portion of the cover which extends outside of the box and over the front portion 12 thereof, and as it raises its nose the lid of the box will be forced upwardly. In consequence the animal can obtain easy access to the interior of the box, and as soon as the animal has removed its head from the box, the cover of which is limited in its movement by the board 18 at the top of the posts 17, the cover 13 will readily drop back into position against the top of the sides 15 and the top of the back 11 and the front 12, and the salt in the box will be kept from moisture by the cover fitting tightly against the side and front and back of the box. The box or boxes may be readily adjusted at any height by releasing the arm-bearing nut on the rods 19, and thus throw the semicircular portion of the rods 20 and the projections on said semicircular portions out of engagement with the post by which the box or boxes are supported.

Having thus described my invention, what I claim, and desire to secure by Letters Patent of the United States, is—

1. In a device of the class described, the combination of a box having a back substantially higher than the front portion therein, a cover hinged to said back portion, extensions projecting rearwardly from the box, upright posts attached to the extensions of said box, a board attached between said posts for limiting the upward movement of said cover, screw-threaded rods adjustably mounted in the extension of the sides of said box and in said upright posts, for the purposes stated.

2. In a device of the class described, the combination of a box having a back portion substantially higher than the front portion therein, a cover hinged to said back portion, sides in said box, extensions of said sides, upright posts attached to the extensions of said sides, a board attached between said posts for limiting the upward movement of said cover, screw-threaded rods having semicircular portions on their inner ends extending through the extension of the sides of said box, arm-bearing nuts mounted on said screw-threaded portions, substantially as and for the purposes stated.

3. In a device of the class described, the combination of a box having a back portion substantially higher than the front portion therein, a cover hinged to said back portion, extensions for the box at its rear, upright posts attached to the extensions of said box, a board attached between said posts for limiting the upward movement of said cover, screw-threaded rods having semicircular portions on their inner ends extending through the extension of the sides of said box, arm-bearing nuts mounted on said screw-threaded portions, a projection on the inner end of said semicircular portion of said screw-threaded rods for entering a post or tree when the nuts are screwed against the extensions, of the sides of said box, for the purposes stated.

URIAH HEATER.

Witnesses:
E. T. DUFUR,
L. L. STONER.